United States Patent [19]
Gantt

[11] Patent Number: 5,572,639
[45] Date of Patent: Nov. 5, 1996

[54] METHOD AND APPARATUS FOR INTERACTIVELY MANIPULATING AND DISPLAYING PRESUMPTIVE RELATIONSHIPS BETWEEN GRAPHIC OBJECTS

[76] Inventor: Brian D. Gantt, 8710 Brodie La., Austin, Tex. 78745

[21] Appl. No.: 436,158

[22] Filed: May 8, 1995

[51] Int. Cl.$^6$ ............................................. G06T 3/00
[52] U.S. Cl. ........................ 395/133; 395/137; 395/138; 395/326
[58] Field of Search ............................... 395/133, 135, 395/137–139, 141, 155, 159, 160, 161, 919; 364/474.24

[56] References Cited

U.S. PATENT DOCUMENTS

| | | | |
|---|---|---|---|
| 4,951,231 | 8/1990 | Dickinson et al. | 395/155 |
| 5,101,436 | 3/1992 | DeAguiar et al. | 395/133 |
| 5,123,087 | 6/1992 | Newell et al. | 395/155 |
| 5,133,052 | 7/1992 | Bier et al. | 395/155 |
| 5,237,647 | 8/1993 | Roberts et al. | 395/119 |
| 5,325,475 | 6/1994 | Poggio et al. | 395/133 |
| 5,371,845 | 12/1994 | Newell et al. | 395/155 |
| 5,396,590 | 3/1995 | Kreegar | 395/159 |

*Primary Examiner*—Almis R. Jankus
*Attorney, Agent, or Firm*—Stanford & Bennett

[57] ABSTRACT

A presumptive mode computer aided design and drafting system for interactively manipulating and displaying graphic objects that employ predefined rules to govern the geometric layout and logical relationships representing a physical design, schematic or process flow diagram. The system is configured to comply with the rules employed by various design disciplines. Specific interactive computer graphics behavior is dynamically accessed to interactively update graphic object relationships according to rules of geometric conduct. The rules of geometric conduct may be stored in external databases along with parameters to verify the logical relationships of the graphic objects used in the drawing. Object orientation is employed in the software design of the system to allow new devices or procedures to adopt the behavior of existing definitions. In the preferred embodiment, a selected object floats with a cursor in a graphic environment until located in proximity with underlying graphic objects. The selected object then aligns, jumps and clings to the underlying graphic object or objects according to predetermined rules. For example, the object is automatically rotated, orientated and positioned relative to a cling point into a correct relationship with the underlying object without further input by the operator. Further, the selected object slides along the underlying graphic object maintaining the correct geometric relationship while the operator moves the cursor in proximity with the underlying graphic. The operator either accepts the presumed relationship or moves the cursor away to uncling the selected object.

24 Claims, 13 Drawing Sheets

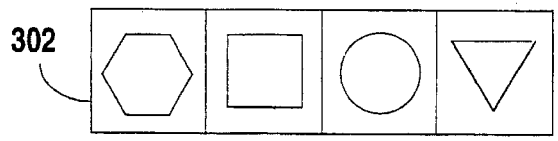
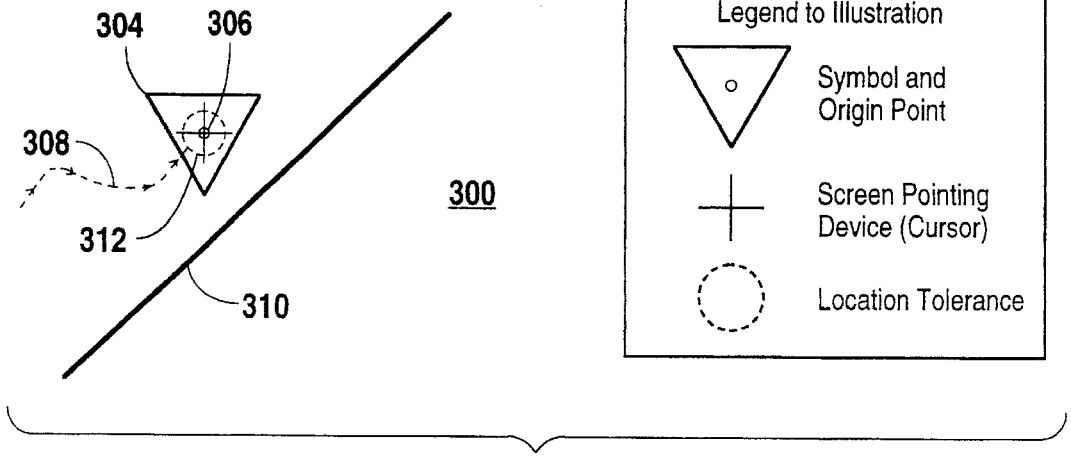
Fig. 3A
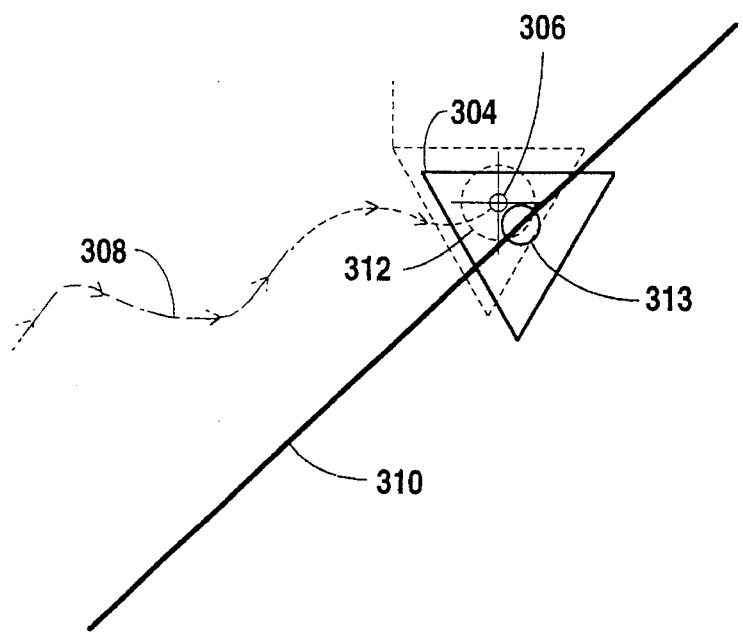
Fig. 3B

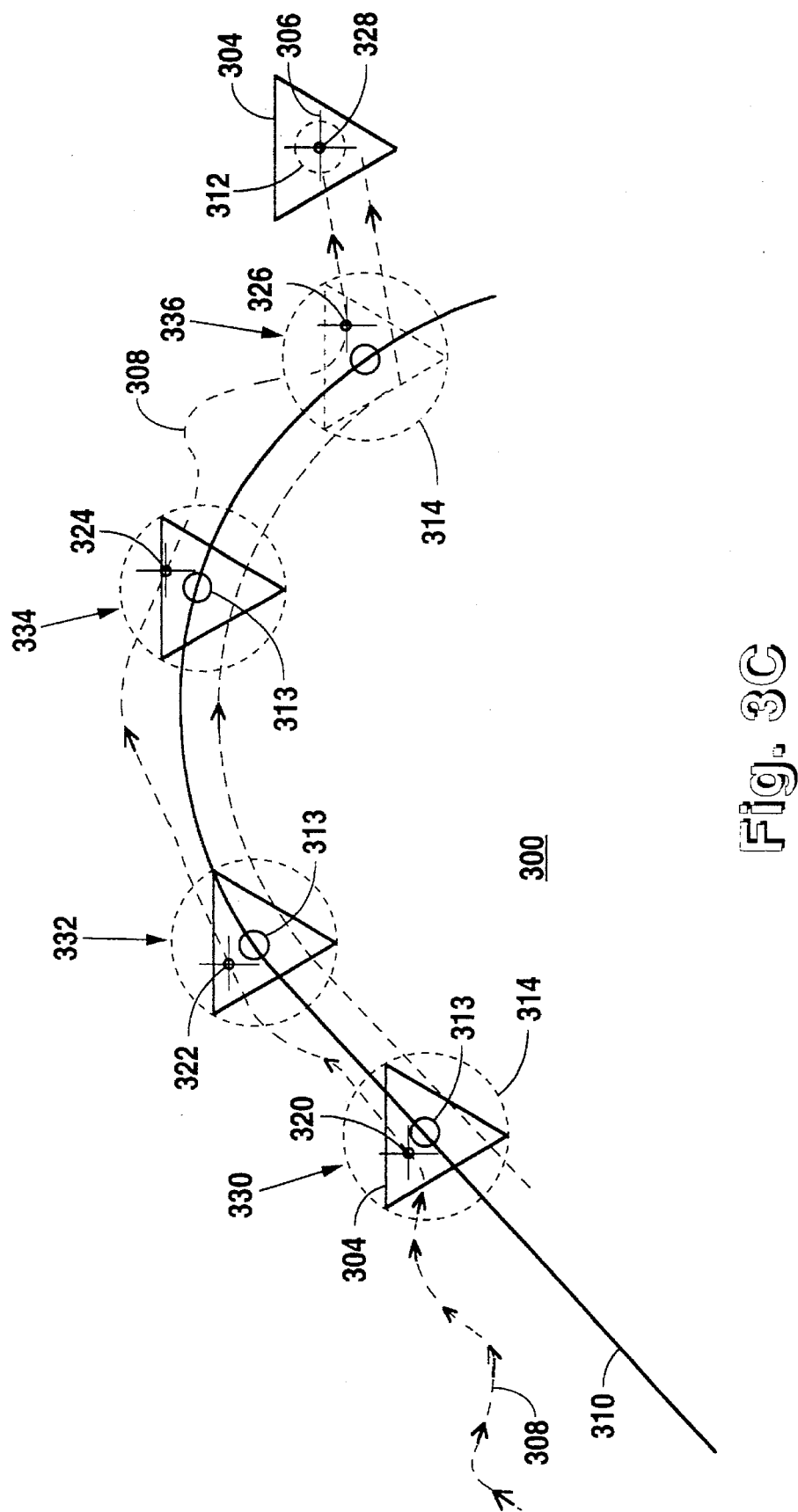

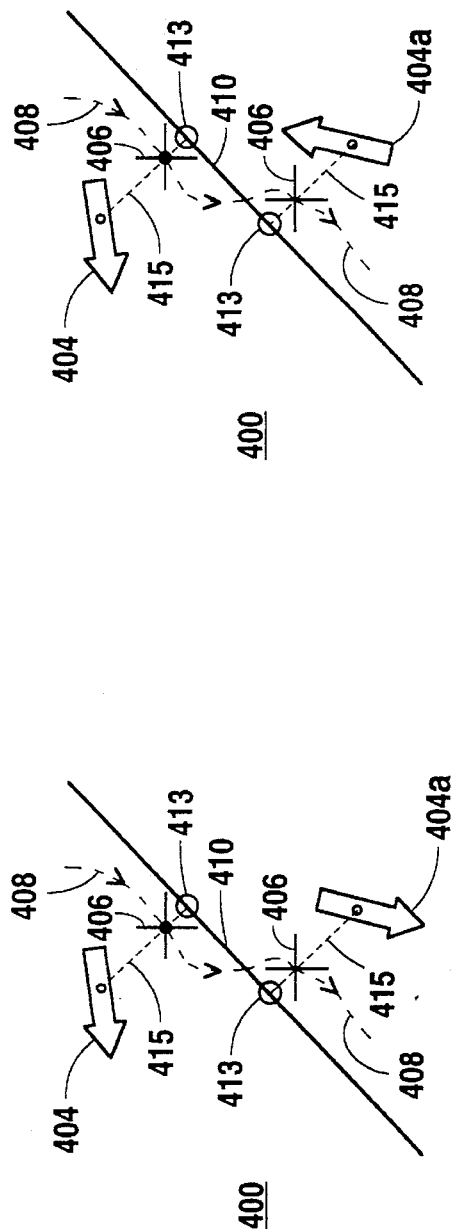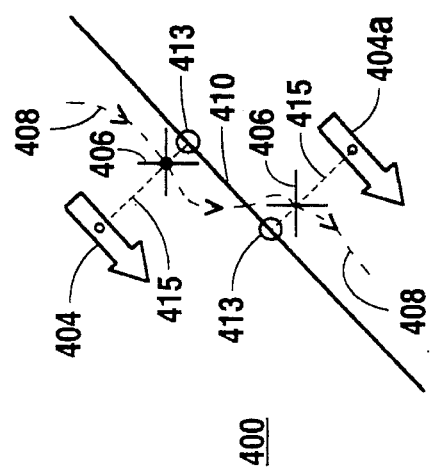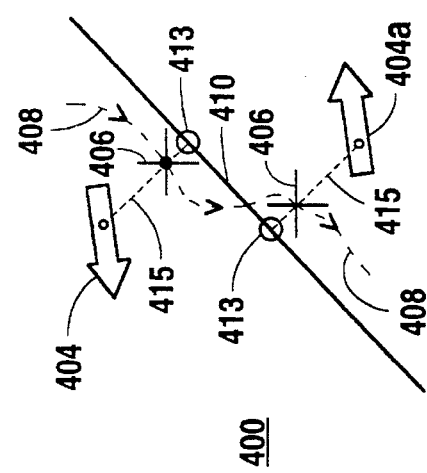

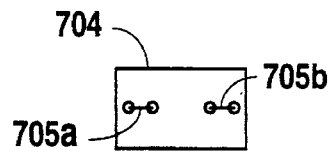
Fig. 7A
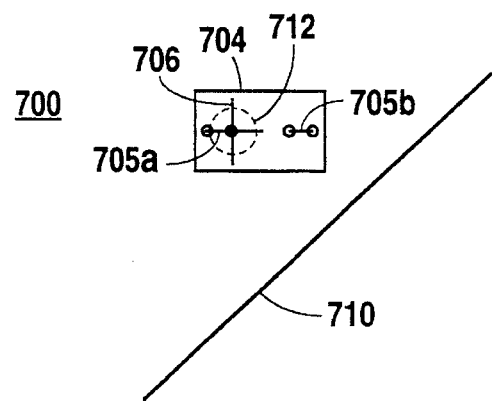
Fig. 7B
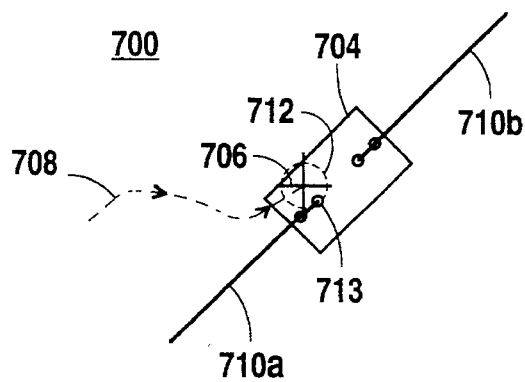
Fig. 7C
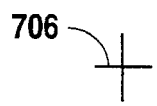
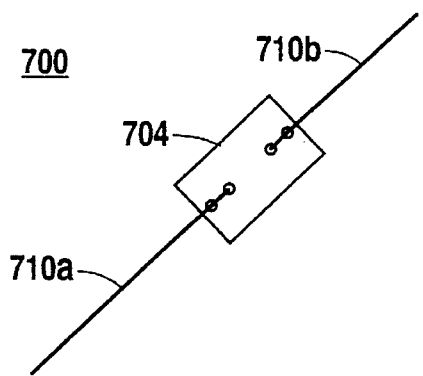
Fig. 7D

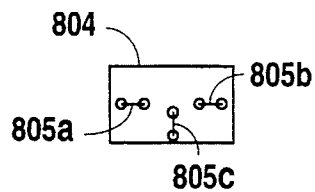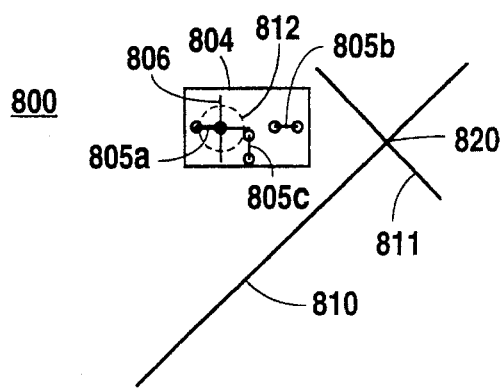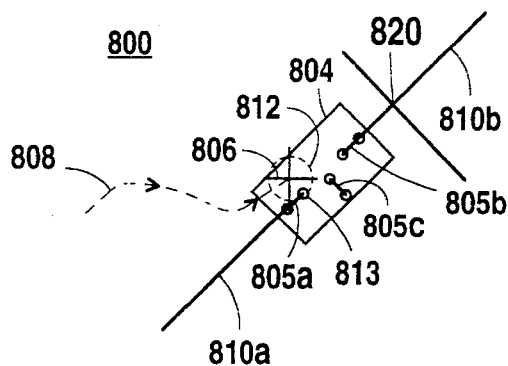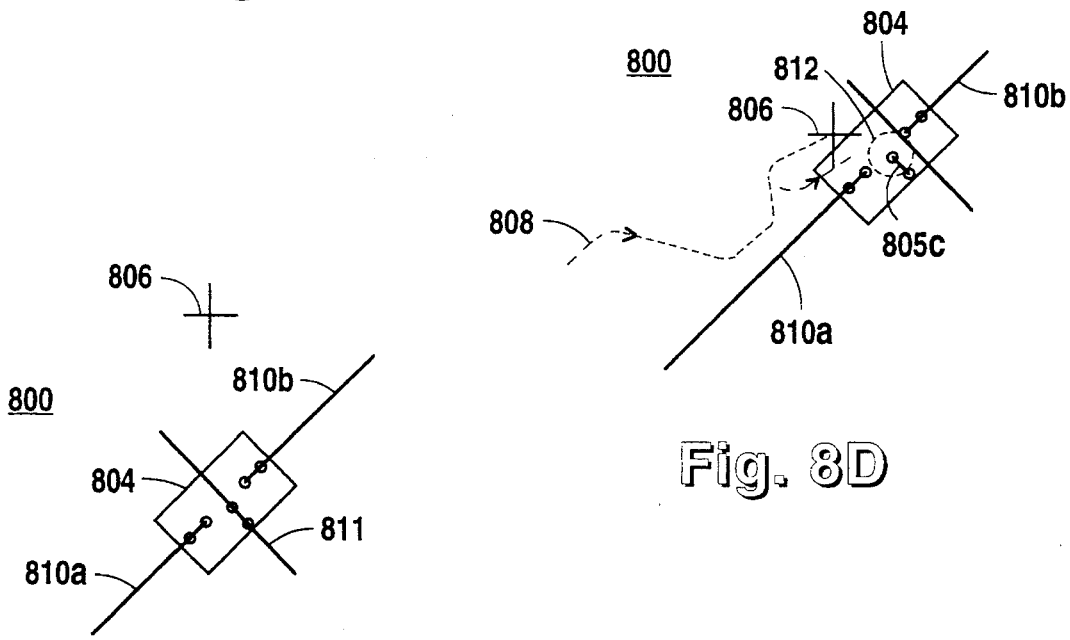
Fig. 8A
Fig. 8B
Fig. 8C
Fig. 8D
Fig. 8E

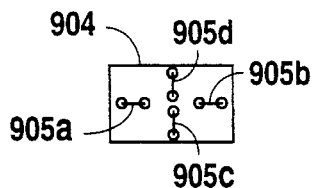
Fig. 9A
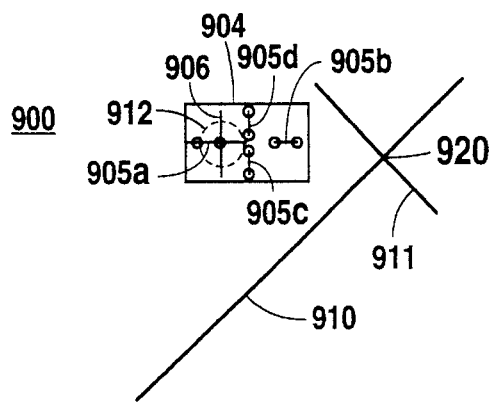
Fig. 9B
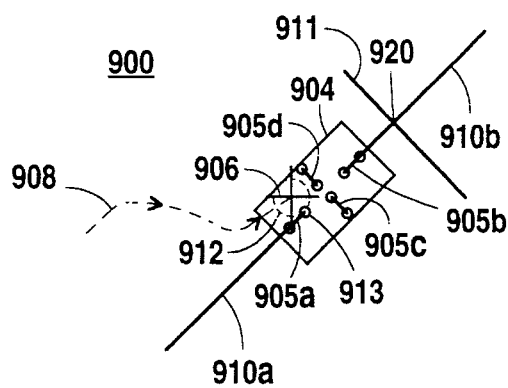
Fig. 9C
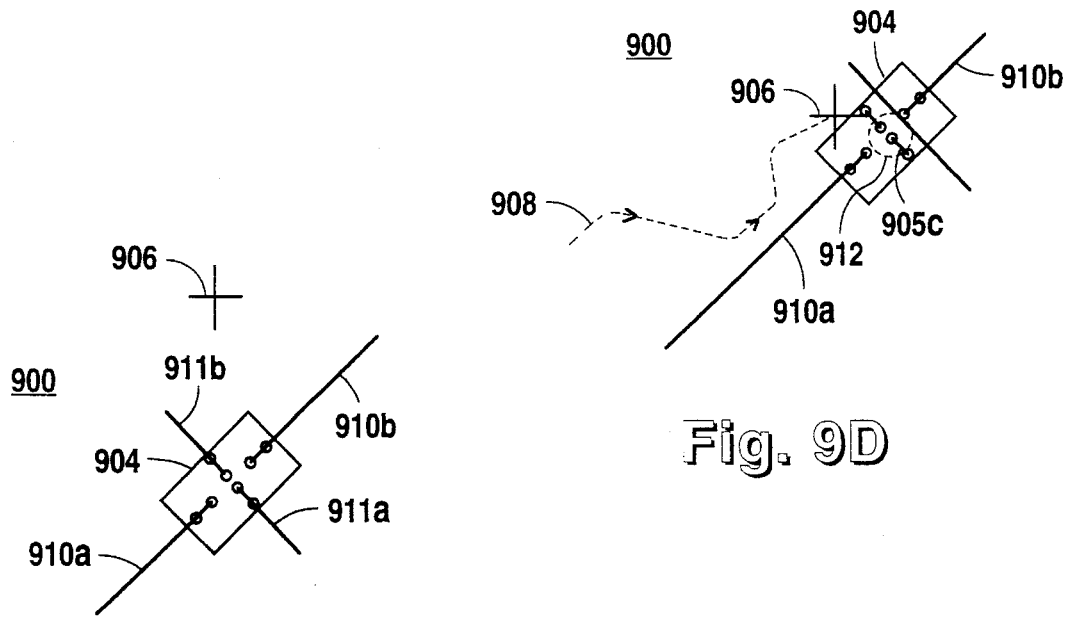
Fig. 9D
Fig. 9E

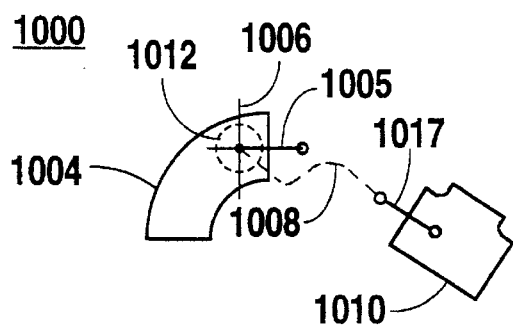
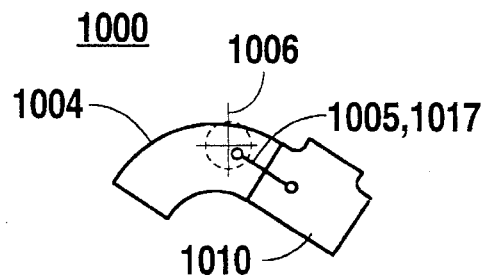
Fig. 10A          Fig. 10B
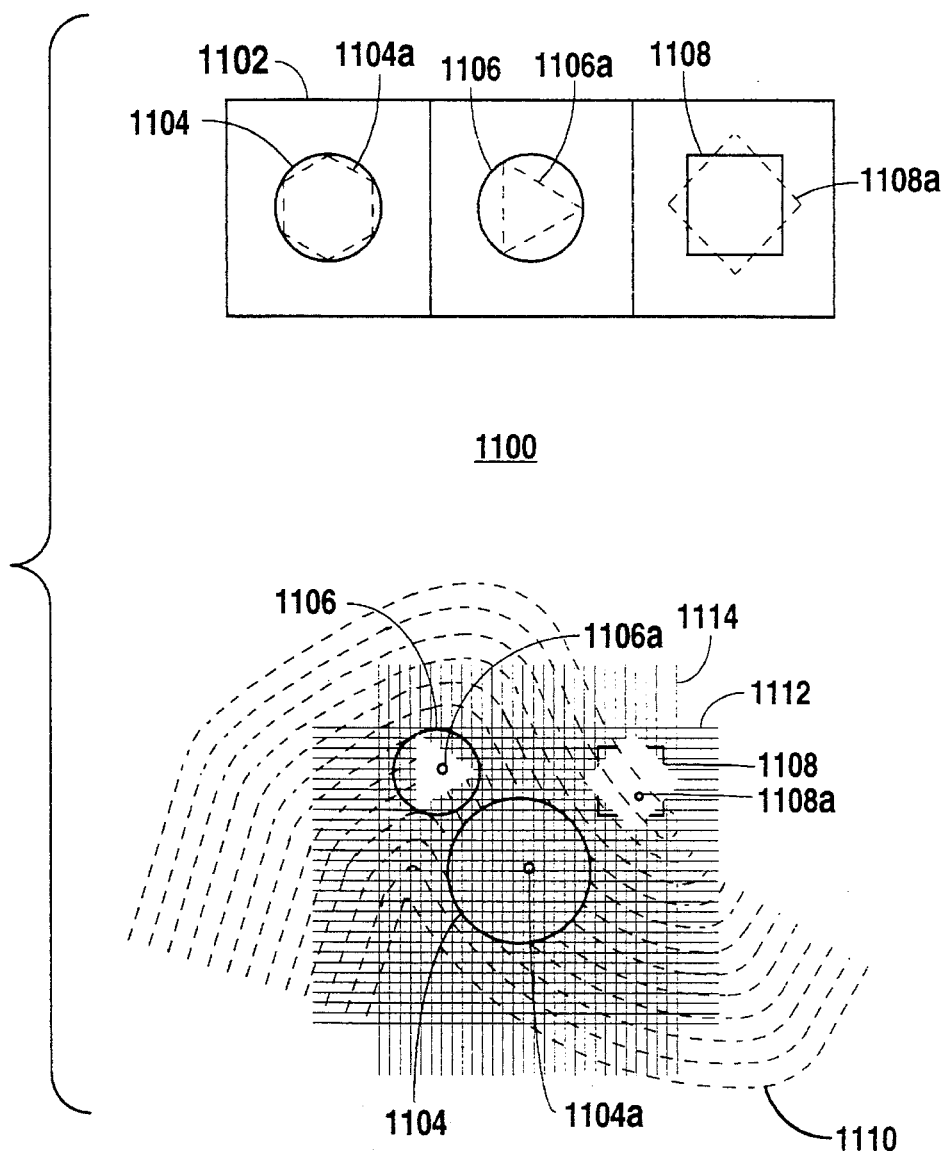
Fig. 11

METHOD AND APPARATUS FOR INTERACTIVELY MANIPULATING AND DISPLAYING PRESUMPTIVE RELATIONSHIPS BETWEEN GRAPHIC OBJECTS

FIELD OF THE INVENTION

The present invention relates to computer aided design and drafting systems, and more particularly to interactively manipulating and displaying presumptive relationships between graphic objects.

DESCRIPTION OF THE RELATED ART

At the present time, the layout of drafted documents is based upon predefined geometric constraints for the graphic representation of engineering designs, utility systems, chemical processes, etc. Traditional computer aided methods for producing these types of digital drawings require the computer operator to indicate where and how a graphic object is to be drawn by the computer. The operator indicates an origin, orientation and connection point for the graphical objects and the computer subsequently produces the digital representation suggested by operator input. If the resulting representation is not correct, the operator either deletes the incorrect graphics from the drawing file or manually adjusts the graphics and attempts to create a new representation that meets defined criteria.

It is presently known that an operator may press a button on a mouse to provide a "tentative point" to the computer to suggest where an object might be placed. The computer responds by placing a graphic "crosshair" at a precise location nearby the point suggested by the operator. If the point suggested by the operator is close to a key coordinate value from an underlying object in the digital file representing the design, the computer places the tentative point at that location and redisplays the graphic object in a specified color. If the resulting location is desired by the operator, a key is depressed on an input device to accept the tentative point and the specific coordinate values are used one time in the immediately following data input operation. If the coordinate location and associated graphic object determined by the computer is not desired by the operator, the mouse button is pressed again to request another tentative point.

Such tentative point mode of operation requires multiple point and click inputs by the operator resulting in rather tedious interaction with a computer aided design and drafting (CAD) system. The locations and geometric selections generated by a CAD system of prior art are often incorrect and must otherwise be adjusted. Further, the operator must be aware of the geometric rules and relationships and usually must be a sophisticated operator or even an expert.

SUMMARY OF THE INVENTION

A method and apparatus according to the present invention replaces the tentative point mode of computer graphics input with a "presumptive point" mode tied to the motion of the input device. In the presumptive mode of operation, a computer system constantly presumes points of interest, referred to as cling points, which are in proximity with an on-screen pointing symbol or cursor for the operator to accept or reject. Predefined rules are maintained to limit selection to objects of interest and to perform the geometric computations that provide other related functions such as tangent, offset, parallel, alignment, end point, major vector, divided segment, extended segment, intersection and other specific coordinate locations derived from the graphic objects that comprise a digital design.

In addition, an interface is provided to accommodate external rule-based input verification procedures, and the newly input graphic object may inherit specific characteristics of underlying object previously accepted. A system according to the present invention eliminates much of the interactive selection and confirmation of graphics components used in drafting of designs, as well as to provide more accurate results in a design.

The present invention automatically employs a rule-based database to verify the juxtaposition of graphic objects within the intended context of the design. The interactive behavior of the graphics objects is constrained by a set of geometric specifications that are constructed in advance of digital data input operations. External procedures for the verification of graphic object relationships occur during digital data input operations to avert the creation of invalid representations of designs. Geometric relationships such as parallel, orthogonal, tangent, etc. are automatically provided for performing the accurate layout of design drawings in a dynamic manner.

For example, a selected object floats with the cursor and then jumps and clings to an underlying graphic object when the cursor is moved to within a predefined minimum distance called the location tolerance of the underlying object. The selected object clings at a predefined offset, orientation, rotation, etc. relative to the cling point, which slides along the underlying object as the cursor is moved by an operator. Other operations may be performed automatically either interactively or when the selected object is accepted, such as cutting or deleting portions of the underlying objects. These presumptive relationships are automatically made and dynamically updated as the operator moves the cursor and floating object to a desired location. The operator then merely accepts or rejects the presumptive relationship with no further input.

A system according to the present invention also offers methods of creating geometric specifications to constrain drafting input operations and produce aesthetically pleasing and geometrically correct results. Techniques are provided for a design analyst to specify the behavior of a graphic object when it is combined with other graphic objects in a design drawing.

A system according to the present invention preferably includes access to external databases for the provision or extraction of information that is related to the design, system or model. In addition, a base of knowledge is provided which may be accessed to ascertain whether the relationships among new graphic objects being added to the file by drafting operator input operations are valid.

The present invention allows an operator to more rapidly produce accurate digital computer drawings that conform to predefined specifications for appearance, content and relationships among the graphic objects that convey cognition for the intent of designs. The computer operator is relieved of the duty of learning the correct layout of graphic objects to assemble a valid representation of a design, system or model. In effect, a system according to the present invention is an "expert" CAD system, so that the operator need not be very knowledgeable to produce correct graphic results and representations.

BRIEF DESCRIPTION OF THE DRAWINGS

A better understanding of the present invention can be obtained when the following detailed description of the preferred embodiment is considered in conjunction with the following drawings, in which:

FIG. 3A is a graphic diagram illustrating operations performed by a system according to the present invention;

FIG. 3B illustrates an initial cling characteristic of a floating object with an existing, underlying object;

FIG. 3C illustrates a continuing clinging characteristic according to the present invention;

FIGS. 4A–4D illustrate yet further examples of the cling characteristic using a system according to the present invention;

FIGS. 6A–6D, 7A–7D, 8A–8E and 9A–9E illustrate various examples of objects including alignment vectors for aligning the graphic objects and modifying underlying objects;

FIGS. 10A and 10B illustrate alignment of two pipe objects using alignment vectors;

FIG. 11 illustrates the present invention used to implement closed clip region objects for partial deletion of graphic objects in a design.

DETAILED DESCRIPTION OF THE PREFERRED EMBODIMENT

Figure 12:
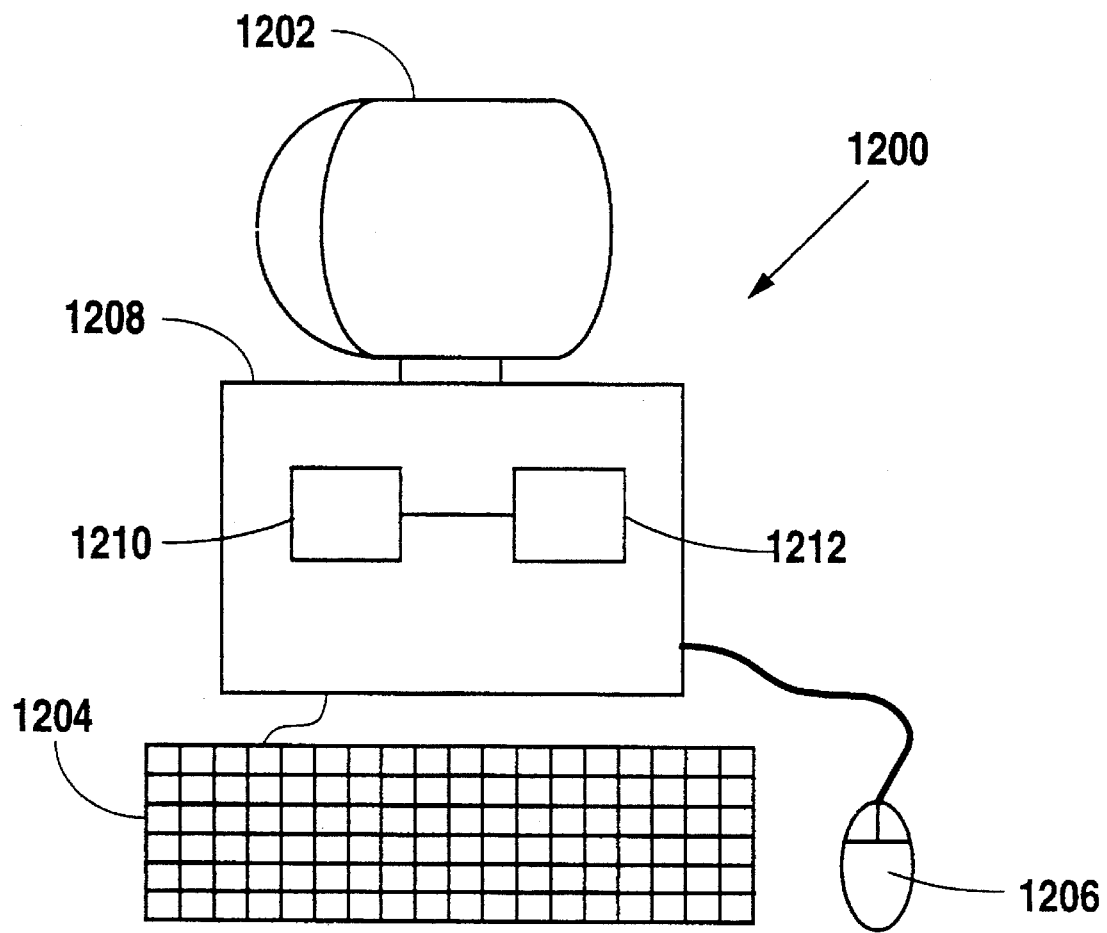
FIG. 12 is a diagram of a computer system implemented according to the present invention.

FIG. 12 illustrates a computer system 1200 implemented according to the present invention. The computer system 1200 is preferably an IBM XT, AT or IBM compatible computer system or any comparable computer system capable of operating as a computer aided design and drafting (CAD) system. The computer system 1200 includes a display device or monitor 1202 for viewing a graphic environment. A keyboard 1204 is also provided for inputting text, as well as a pointing device 1206, such as a mouse or the like, for manipulating graphic objects on the screen of the monitor 1202. A main system unit 1208 includes the necessary logic for running software and processing commands as known to those skilled in the art. For example, a processor 1210, such as an 80386, i486, Pentium, etc. is coupled to memory 1212 for executing software according to the present invention.

The computer system 1200 is preferably implemented as a CAD system according to the present invention by loading software into the memory 1212 for execution by the processor 1208 for receiving input and commands from the keyboard 1204 and mouse 1206 and generating a graphic output on the display 1202. Graphic parameters and geometric relationships are defined in database files stored in memory. It is noted that alternative computer systems and interfaces are contemplated, such as three-dimensional holographic displays for improved visual representation of the graphic environment.

Figure 1:
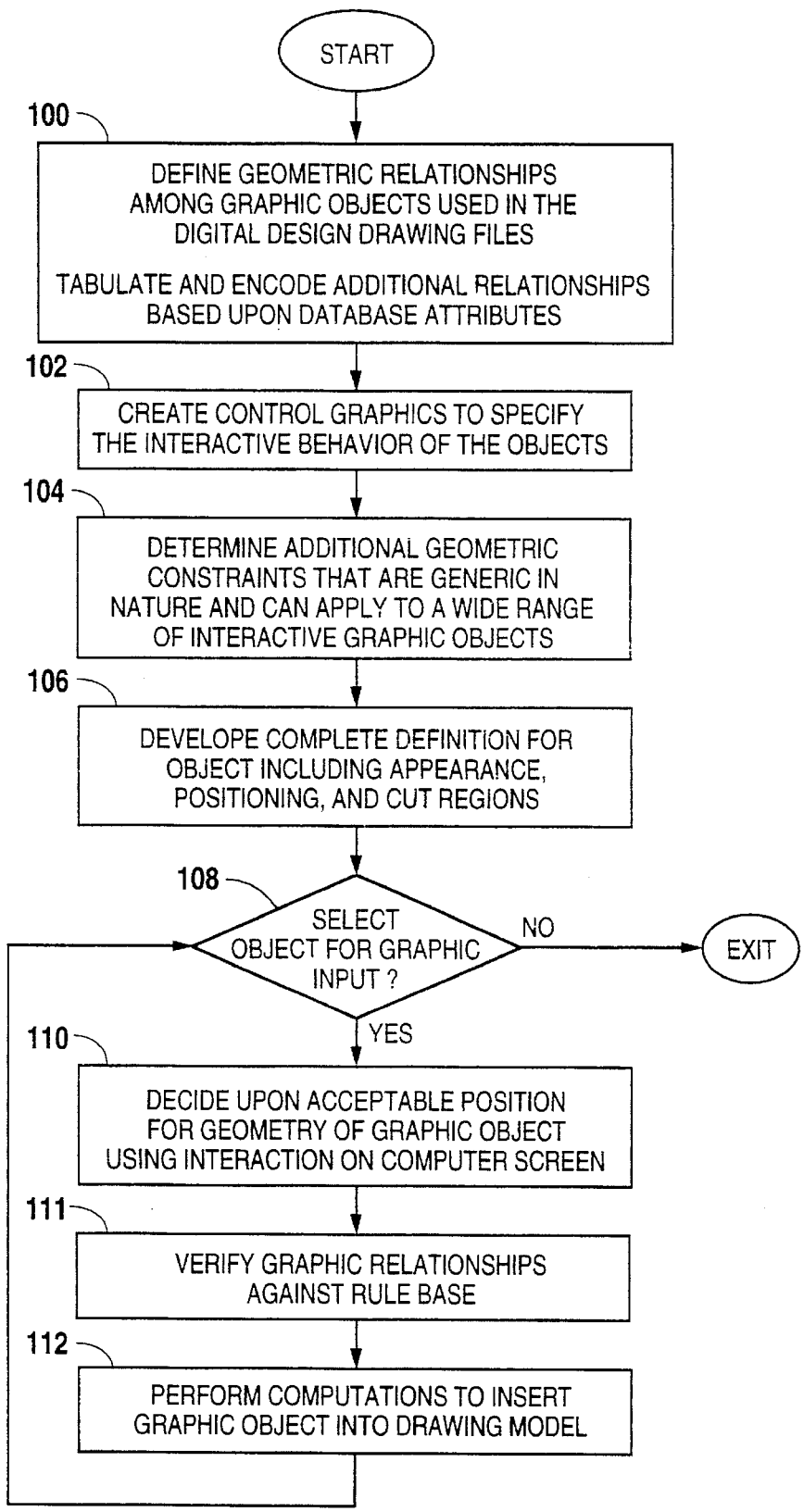
FIG. 1 is a flowchart diagram illustrating operation of a system according to the present invention.

Referring now to FIG. 1, a flowchart diagram is shown illustrating operation of a system according to the present invention. The flowchart illustrates that the system is designed to create representations that conform to predefined specifications for the geometric and logical relationships that exist among graphic objects in a computer based drawing representing a design, system or model.

In step 100, the applicable specific geometric relationships such as alignment, offset, etc. are defined for each entity that is represented in one or more drawings. Additionally, any relationships that are based upon associated database attributes are tabulated and encoded. In the next step 102, the graphic objects used as geometric constraint components are created according to specifications for the desired functional behavior. In the next step 104, any additional generic geometric constraints that may apply are determined and tabulated.

In the next step 106, the constraint definitions for the object are created as a collection of digital data that appears in a recognizable form such as a graphic symbol. The symbol comprises a series of components, some of which are always displayed on a computer screen as the normal graphic representation of the associated object, some components which are not normally displayed on the screen except as an aid to their definition, some logical verification components are tabulated as a digitally encoded rule-based record that is associated with the symbol, and some components are stored as textual specification data that is provided to the control software at the moment the object is activated for inclusion in the design, system or model. The textual data may be any one of several formats, such as ASCII (American Standard Code for Information Interchange) or the like.

In the next step 108, an object is selected for input by the operator using any of several techniques including the selection of a graphic icon from a computer screen (FIG. 2) that represents the object, typing in a keyed command that causes the object to become active, or any other means of indicating to a software program that the desired object is to be added to the drawing using the geometry processing engine.

In the next step 110, the object is read into the geometry processing engine and graphically interacts with other objects according to the specifications provided in the symbolic definition and the constraints of any external database attribute or knowledge based verification process. Feedback is provided to the operator to indicate the integrity of the proposed relationships between the new object and existing graphic objects in the digital drawing. Such feedback includes changing the color of the affected graphic objects, providing additional on-screen motions to the affected symbol to indicate a correct or incorrect validation result, or providing unique auditory sounds to indicate a correct or incorrect validation result. In the next step 111, the graphic representations are verified against a rule-based database.

In the next step 112, the object is accepted by the operator as being a correct representation at which point the geometry engine inserts the symbol in context into the graphic representation of the design, system or model, taking into account all geometric control specifications provided with the symbolic definition. Once the new graphic object is added to the existing digital file, the sequence of operations returns to step 108 and drafting operations continue. In particular, steps 108–112 are repeatedly performed in sequential manner until the operator has added all desired objects, and operation is then completed.

Figure 2:
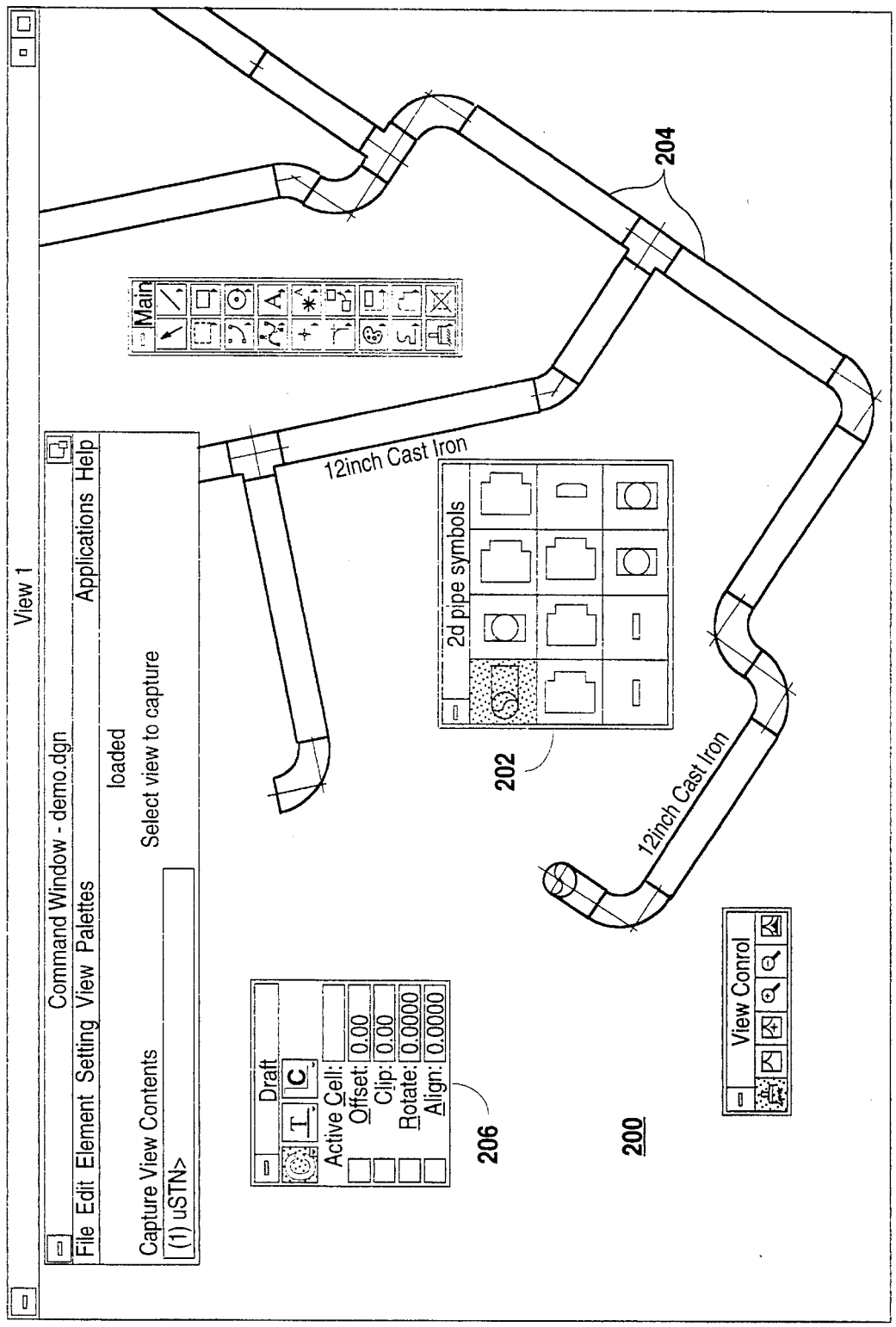
FIG. 2 is a representative computer screen that an operator interacts with using a pointing device to create digital drawings according to the present invention.

Referring now to FIG. 2, a representative computer screen 200 is shown in the context of interactive computer aided design software. Steps 100–106 have previously been performed at this point so that the operator interactively selects objects in step 108 and accepts a selected object in step 112 until the design is completed. The operator selects objects with a cursor as known for window environments, although the present invention is not limited to a windows environment. A tool palette 202 is provided containing one or more icons that indicate the graphic objects that are available for processing by the geometry engine. A series of objects 204 that have been previously placed appear on the screen 200, which in this particular case is a series of pipes for a plumbing system. Of course, other types of objects are contemplated, such as engineering designs, electrical schematics, utility systems such as power generation and distribution grids, chemical processes, etc. The objects 204 thus are represented in the underlying design file. An optional control panel 206 is provided to specify any additional geometric functions that are to apply to the symbolic object. The balance of the screen depicts a typical interactive computer aided design environment.

FIG. 3A is a graphic diagram illustrating operations performed by a system according to the present invention. A computer screen 300 similar to screen 200 is shown including a tool palette 302 for selecting graphic objects. The operator selects a symbol from the tool palette 302 and activates an object 304 with the cursor 306, where the geometry processing engine performs the activation as described above. The selected object 304 floats with the cursor 306 (thus called a floating object) at a particular displacement, rotation and orientation according to predetermined criterion. In the example shown, the floating object 304 maintains zero degree rotation with its origin on the cursor 306.

Once selected, the operator moves a pointing device to move the cursor 306 and the object 304 within the computer screen 300 along any desired path 308, and eventually within proximity of an underlying object 310. The floating object 304 is selected and shown on the computer screen 300 but is not made part of the underlying design file until accepted at a desired location by the operator. The underlying object 310 has already been previously accepted and therefore part of the underlying design file. Throughout this disclosure, an underlying object exists in the underlying design file, but a selected object to be placed is not made part of the design file until accepted by the operator.

A predetermined and programmed location tolerance, illustrated with a dotted circle 312 but normally not displayed, identifies a minimum perpendicular distance which determines when the object 304 is close enough to the underlying object 310 to establish an association or graphic relationship. When the designated origin point of the object 304 moves to within the location tolerance 312 with respect to the underlying object 310 or with respect to any other object where a graphic relationship is allowed, the "cling" mode of interaction is invoked whereby the floating object 304 "jumps" onto the underlying graphics object 310 as though it were magnetically attracted. In FIG. 3A, the origin and cursor 306 are positioned at a distance from the underlying object 310 greater than the location tolerance 312, so the object 304 remains floating with or otherwise attached to the cursor 306.

FIG. 3B illustrates the initial cling characteristic of a floating object with an existing, underlying object. In particular, once the object 304 is within the location tolerance of the underlying object 310, the floating object 304 jumps from the cursor 306 to cling to the underlying object 310. In the example shown in FIG. 3B, the jump is the shortest or perpendicular distance where the origin of the object 304 aligns and is coincident with the closest or cling point 313 of the underlying object 310. The cling point 313 is typically displayed on the screen 300 for purposes of visual feedback to the operator, although it may alternatively be transparent or invisible if desired.

FIG. 3C illustrates how the floating object 304 magnetically clings to the underlying object 310 as the cursor 306 is moved in proximity with the underlying object 310. As the pointing device is moved by the operator, the object 304 follows the extent of the underlying object 310 and, if an offset distance, rotation angle, or other geometric specification has been defined, the object 304 assumes a position with respect to the geometric specifications and the active "magnetic" cling point 313 on the underlying object 310. In the example shown in FIG. 3C, a programmed rejection tolerance, illustrated as a dotted circle 314 about the origin of the object 304, is defined where the object 304 remains clinging to the underlying object 310 while the cursor 306 is within the rejection tolerance. The rejection tolerance is preferably larger than the location tolerance to achieve a hysteresis effect. It is noted that the location and rejection tolerances are different parameters which are toggled so that only one is active at a time. The location tolerance determines when an object clings to an underlying object and the rejection tolerance determines when a clinging object unclings from the underlying object.

The cursor path 308 and the underlying object 310 are extended to illustrate the cling characteristic. The floating object 304 "slides" in alignment with the underlying object 310 as the cursor 306 traverses the path 308. In particular, when the cursor 306 is at the locations 320, 322, 324 and 326 as shown, the floating object 310 assumes the corresponding positions 330, 332, 334 and 336, respectively. It is noted that the cursor 306 remains within the rejection tolerance defined for the floating object 304 for the positions 330, 332, 334 and 336.

If the operator desires to "uncling" from the underlying graphic object 310, operator moves the cursor 306 a distance greater than the rejection tolerance away from the underlying object 310 and the floating object 304 "jumps" away from the underlying object 310 to the cursor 306 as though it were magnetically repelled. This is shown at a location 328 of the cursor 306, where the floating object once again floats with the cursor 306 as shown at the position 328. If there is an additional specification for the logical relationship between the floating object 304 and the underlying object 310, and if that relationship is not valid for the particular case, the floating object 304 does not "cling" to and is prevented from floating near the underlying object by an algorithm that displaces the floating object's position with respect to the on-screen pointing device. An additional warning such as an auditory "beep" or visual cue such as a sudden red color change in the floating object 304 is issued by the computer.

Figure 3D:
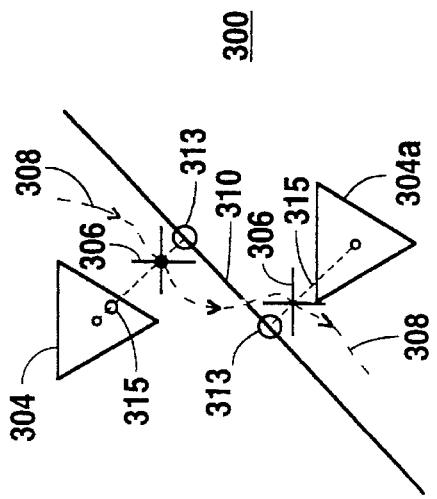
FIGS. 3D–3F illustrate possible behaviors that can be applied to a floating object while it is clinging to an underlying object.
Figure 3E:
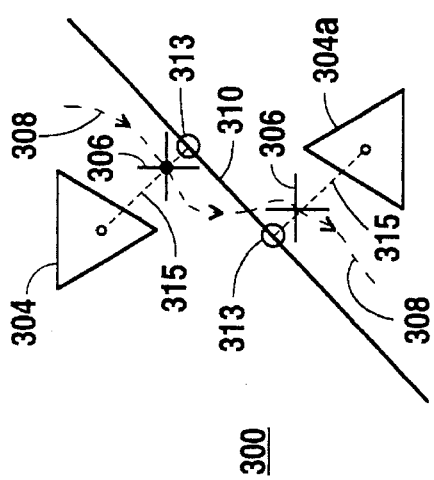
Figure 3F:
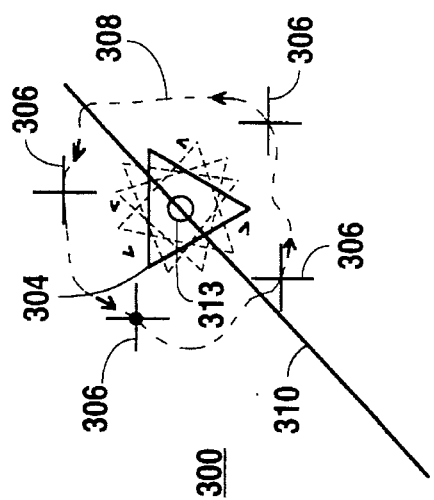

FIGS. 3D–3F illustrate possible behaviors that can be applied to the floating object 304 while it is clinging to an underlying object 310. These behaviors are predefined according to geometric constraints for a given object. FIG. 3D illustrates that the object 304 may be spun about an initial cling point 313 by manipulating the cursor 306 around the cling point 313, in contrast with FIG. 3C showing the object 304 predefined to maintain a zero degree orientation regardless of its location. Further, the object 304 does not slide but sticks to the initial cling point and rotates according to movements of the cursor 306. FIG. 3E shows the object 304 positioned at a specified perpendicular offset 315 from cling point 313 in the direction of the cursor 306 and maintaining a zero degree orientation. Note that the floating object 304 jumps to the opposite side of the underlying object 310, as shown as 304A, when the cursor 306 traverses from one side to the other of the underlying object 310. FIG. 3F shows the object 304 (304A) at a 180 degree rotation of the underlying object 310 at a specified perpendicular offset 315 from cling point 313 in the direction of the cursor 306, again on opposite sides of the underlying object 310. Other variations are possible, of course, including multiple instances of the floating object, such as a mirror image of the floating object at a specified perpendicular offset from "cling" point in the direction of the cursor 306, etc.

FIGS. 4A–4D illustrate yet further examples of the cling characteristic using a system according to the present invention. In each case, a cursor 406 with a floating object 404 is moved within a screen 400 along a path 408 relative to an underlying object 410 already placed on the screen 400. The object 404 is kept a predefined distance from the underlying object 410 relative to a sliding cling point, which slides along the underlying object 410 following the cursor 406. The floating object 404 flops to the other side of the underlying object 410, as indicated at 404A, when the cursor 406 crosses over the underlying object 410 in a similar manner as described previously. It is noted that only one object is shown at any given time in the example of FIGS. 4A–4D, where the designations 404 and 404A illustrate orientation of the same object on opposite sides of the underlying graphic object 410.

Other graphic relationships define the orientation and rotation of the floating object 404 based on the position of the cursor 406. In FIG. 4A, the object 404 is mirrored about the underlying object 410 when flopped to 404A. In FIG. 4B, the object 404 is mirrored about a perpendicular 415 when flopped to 404A. In FIG. 4C, the object 404 is mirrored with respect to both the perpendicular 415 and the underlying object 410 to 404A. In FIG. 4D, the object 404 maintains a parallel relationship to 404A.

Figure 5:
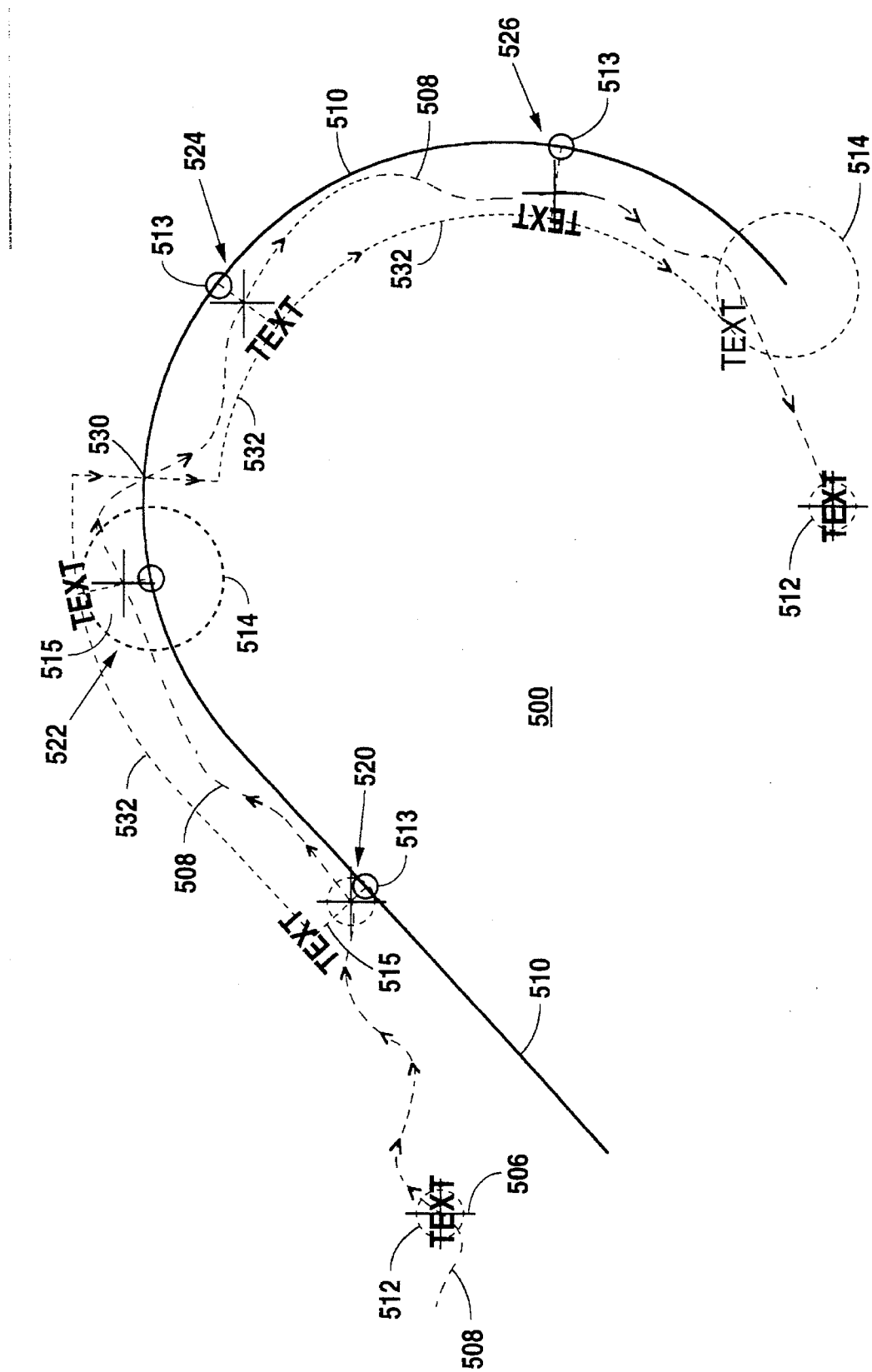
FIG. 5 illustrates how TEXT is handled in context with other graphic objects.

FIG. 5 illustrates how TEXT is handled in context with other graphic objects. Once the related symbolic object 510 has been drawn on a screen 500, a TEXT annotation "floats" with a cursor 506 while obeying constraints for placement of the TEXT. The TEXT is made to align to the underlying graphic object 510 using specified offsets, parallels and tangencies. In the example shown, the TEXT begins with an initial location tolerance, identified by dashed circle 512 and a larger rejection tolerance as illustrated by a dashed circle 514, both with respect to an origin of the TEXT. At first, the TEXT floats with the cursor 506 until the cursor 506 is within the location tolerance, at which time the TEXT jumps to align parallel and at a perpendicular tangent with respect to the underlying graphic object 510, but separated by a predefined offset 515. While the cursor 506 is moved along a path 508, within the rejection tolerance, the TEXT aligns tangentially with the underlying object 510 at the defined offset 515. This is illustrated at cursor positions 520, 522, 524 and 526. When the cursor 506 crosses over the underlying object 510 at point 530, the TEXT preferably jumps to the opposite side, but maintains an orientation to allow the TEXT to be read in normal upwards fashion. A dotted line 532 illustrates the path that the TEXT follows. Furthermore, a characteristic is defined where the TEXT automatically re-aligns itself at 180 degree increments, which occurs between positions 524 and 526, to maintain upward reading orientation. When the cursor 506 is moved outside the rejection tolerance, the TEXT jumps back to float with the cursor 506 at an origin, and the location tolerance is re-established.

Figure 6A:
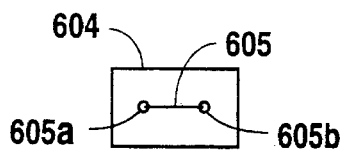

FIGS. 6A–6D, 7A–7D, 8A–8D and 9A–9D illustrate various examples of alignment vectors for inserting and cutting graphic objects. FIG. 6A illustrates an object 604 with a single alignment vector 605 having two points, an origin point 605a for geometry calculations and an alignment point 605b for establishing orientation and direction of the alignment vector 605 and the object 604. Although the object 604 is shown as a simple rectangle, it can be any object following particular alignment rules, such as pipes, electrical components, etc.

Figure 6B:
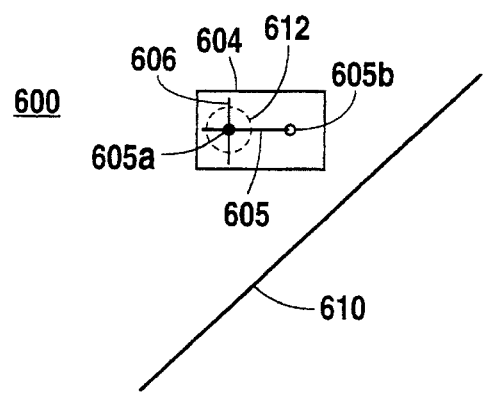
Figure 6C:
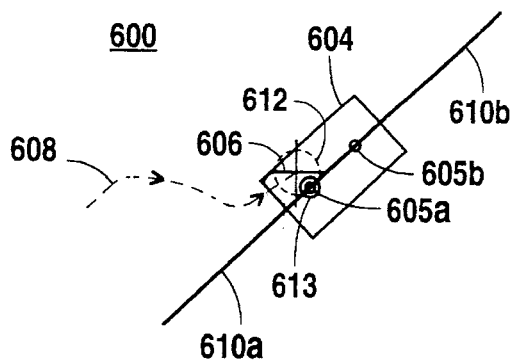

FIG. 6B shows a screen 600 with an underlying object 610 and a floating object 604 floating with a cursor 606 for insertion, where the underlying object 610 is illustrated as a single line segment. The object 604 includes an alignment vector 605 where the cursor 606 preferably aligns with the origin point 605a. A location tolerance is predefined and indicated by a circular outline 612 around the cursor 606. The object 604 is moved with the cursor 606 along a path 608 and brought within the location tolerance of the underlying object 610, where the object 604 snaps to and aligns with the underlying object 610, as shown in FIG. 6C. In particular, the origin point 605a jumps to a cling point 613 and the object 604 and alignment vector 605 rotate to align so that the second point 605b lies on top of the underlying object 610. The object 604 now clings and slides along the underlying object 610 in a similar manner described previously, where a rejection tolerance is usually defined for maintaining cling with movement of the cursor 606.

It is noted that the eventual desired result is to "connect" the object 604 to the underlying object 610 at the origin point 605a, thereby affecting the underlying object 610 in the data base as well as graphically, if desired. In the example shown in FIG. 6C, the underlying object 610 is preferably split into two separate line segments 610a, 610b at the origin point 605a of the alignment vector 605. The underlying object 610 is preferably immediately modified during the cling action and dynamically updated as the object 604 is moved along the underlying object 610, where the respective lengths of the line segments 610a, 610b are modified accordingly. Alternatively, the underlying object 610 is not affected until the object 604 is actually accepted at a desired location.

Figure 6D:
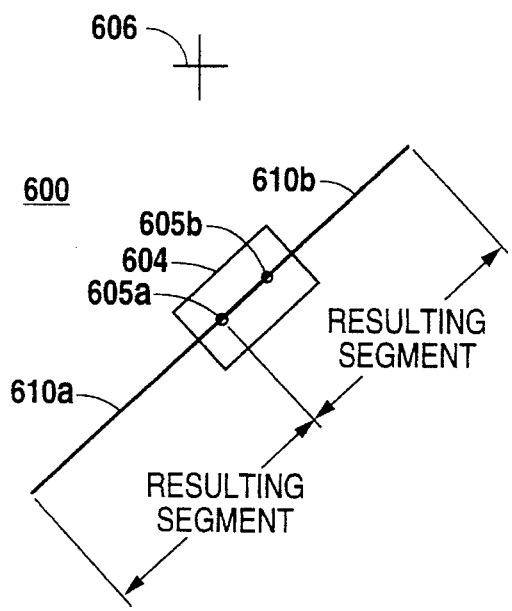

In FIG. 6D, the operator has accepted an appropriate location of the object 604, where the underlying object 610 is split into two separate vectors 610a and 610b at the common origin point 605a. It is appreciated that the operator had to only select the object 604, move the cursor to within a predetermined proximity of an underlying object 610, and the system automatically aligned the object 604 with respect to the underlying object 610 and further modified the underlying object 610 according to predefined rules. Then the operator simply moves the cursor in proximity of the underlying object 610 to select the desired location, and accept the object 604 and the object 604 is added.

FIG. 7A illustrates an object 704 including a double alignment vector 705 in collinear mode with two spaced vectors 705a and 705b, each including origin points and alignment points for directional purposes in a similar manner as shown in FIG. 6A. The separation between the respective origin points of the alignment vectors 705a and 705b defines a cut length for cutting an underlying object. In FIG. 7B, a screen 700 is shown including an object 704 selected for connection to an underlying graphic object 710, which is another line segment as shown. When the object 704 is moved into proximity with the underlying object 710 as shown in FIG. 7C, the origin point of vector 705a clings to a cling point 713, the object 704 and vectors 705a, 705b rotate to align with the underlying object 710, and the underlying object 710 is divided into two separate line segments 710a, 710b separated by the predefined cut length. Again, the underlying object 710 is either modified or cut immediately or modified after the object 704 is actually accepted. Again, the floating object 704 clings and slides along the underlying object 710 while the cursor 706 is moved within the predefined proximity or rejection tolerance, continually redefining the location of the cut.

Eventually the operator selects the location of the object 704, and the object 704 is inserted and the underlying object 710 is appropriately divided as shown in FIG. 7D. As a practical example, if a floating object includes specific definitions of collinear vectors, the geometry engine cuts the underlying linear graphic object and connects the resulting linear segments to the collinear vectors. This has the effect of breaking a line and inserting a device that forms part of the line, such as a fuse on a circuit schematic.

FIG. 8A illustrates an object 804 including double alignment vectors 805a, 805b in collinear mode with an additional orthogonal alignment vector 805c. The collinear vectors 805a, 805b are two spaced vectors, where all three vectors include an origin point and an alignment point for directional purposes as described previously. The orthogonal alignment vector 805c is preferably placed between and orthogonally aligned with the collinear vectors 805a, 805b as shown. The separation between the collinear vectors 805a, 805b defines a cut length.

In FIG. 8B, the object 804 with the alignment vectors 805a, 805b and 805c is selected for interaction with underlying graphic objects 810 and 811, where the primary vector 810 orthogonally intersects a secondary vector 811 at a point 820 as shown. Again, a screen 800 is shown including a cursor 806 for locating the object 804.

When the object 804 is in proximity of the underlying object 810 as shown in FIG. 8C, the collinear vectors 805a, 805b cling, align and cut the underlying primary vector 810 into two separate vector objects 810a, 810b separated by the predefined cut length in a similar manner as described previously. The origin point of the vector 805a has a location tolerance for jumping and clinging with the primary vector 810. The object 804 clings and slides along the primary vector 810.

As illustrated in FIG. 8D, the orthogonal alignment vector 805c also has a separate location tolerance defined for its origin for clinging to the secondary vector 811. Thus, when the origin point of the orthogonal alignment vector 805c is within its location tolerance with the secondary vector 811, the object 804 and alignment vectors 805a, 805b and 805c jump so that the origin and alignment points of the vector 805c align with the underlying vector 811. The operator may move the cursor 806 about a rejection tolerance, where the object 804 remains static and aligned with the intersection point 820.

In FIG. 8E, the operator accepts the result, and the underlying primary segment 810 is divided into two collinear line segments 810a, 810b separated by the cut length, where the cut length is divided on either side of the secondary vector 811. In the example shown, the primary vector 810 is divided equally on either side of the secondary vector 811, although unequal divisions and non-orthogonal intersections, e.g. isometric, etc. are just as easily achieved as desired.

FIGS. 9A–9E are similar to FIGS. 8A–8E, except illustrating primary 905a, 905b and secondary 905c, 905d collinear alignment vectors defining two separate cut lengths for the primary 910 and secondary 911 underlying objects, respectively. The primary and secondary vectors 910, 911 are divided into two portions 910a, 910b and 911a, 911b, respectively, divided by respective cut lengths, and the object 904 is aligned and places as desired.

FIGS. 10A and 10B illustrate operation of alignment vectors for aligning an underlying T pipe object 1010 and a selected elbow pipe object 1004 using alignment vectors on a screen 1000. The underlying T pipe object 1004 includes an alignment vector 1005 and the T pipe object 1010 includes an alignment vector 1017, each with an origin point and an alignment point. The operator selects the elbow object 1004 having a predefined location tolerance about the origin point of the vector 1005. The elbow object 1004 floats with the cursor 1006 it is within the location tolerance of the origin point of the alignment vector 1017 of the T pipe object 1010, where the elbow object 1004 is automatically rotated and positioned so that the respective origin points and alignment points of each of the alignment vectors 1005, 1017 overlap. In this manner, the two objects 1004 and 1010 are automatically aligned with each other by the system, and the operator need only accept or reject the proposed relationship. In particular, if the operator intended to connect the objects 1004, 1010 as proposed, the relationship is accepted, and if not, the operator simply moves the elbow object 1004 beyond the rejection tolerance for connection with another object as desired.

It is noted that the particular alignment vectors described herein are for purposes of illustration. Thus, alignment vectors need not be collinear nor orthogonal but may be aligned at any desired orientation and angle.

FIG. 11 illustrates the present invention used to implement objects including clip regions for partial deletion of underlying graphic objects in a design. A palette 1102 is provided on a screen 1100, where the palette includes three objects 1104, 1106 and 1108, each having corresponding clip patterns 1104a, 1106a, and 1108a, respectively. Also provided on the screen 1100 is a set of underlying object symbol patterns, including a pattern of splines 1110, a horizontal line pattern 1112 and a vertical line pattern 1114 intersecting one another as shown. The operator selects one of the objects 1104, 1106 and 1108 from the palette 1102, and the selected object floats with the cursor as the cursor is moved across the screen 1100 by the operator. As the selected object coincides with or covers the patterns 1110, 1112, or 1114, a portion of all or certain ones of the underlying patterns 1110, 1112 and 1114 that are coincident with the corresponding clip region of the selected object is deleted.

In particular, the clip pattern 1104a deletes the coincident portion of the pattern of splines 1110, but otherwise does not affect the horizontal or vertical pattern of lines 1112, 1114. The clip pattern 1106a deletes the coincident portion of all of the patterns 1110, 1112 and 1114. The clip pattern 1108a deletes the coincident portion of the horizontal and vertical line patterns 1112, 1114, but does not affect the underlying pattern of splines 1110. This partial deletion is contrasted with simple masking capability, where the graphic portion of the object is obscured but the object "remains" in the graphic file. Although the present invention may be used for partial masking, partial deletion involves actually deleting the coincident portion of the underlying graphic objects in a selective mode.

It is noted that the partial deletion may be performed interactively as the selected and floating object is moved across the screen 1100. However, this is computationally intensive and may cause a computer system to slow down considerably. Thus, the object is usually drawn and the underlying deletions are preferably performed upon acceptance of object at a desired location.

An example of objects including clip patterns to partially delete any underlying graphic object elements is TEXT, where it is desired to create "white space" for TEXT annotation. The objects to be deleted are contained in a specification for that type of annotation. In FIG. 5, for example, if the TEXT overlaps certain underlying objects, a portion of the object coincident with the TEXT is deleted. Also, if the definition of the floating object includes a closed shape drawn with specific graphic parameters, the geometry object engine causes the CAD system to partially delete all specified graphic objects that fall within the defined region. This has the effect of "cleaning up" graphic elements that would otherwise appear to be visually merged with the floating object.

It is now appreciated that a presumptive mode CAD system according to the present invention interactively manipulates and displays selected objects according to predefined geometric relationships for acceptance by an operator. The system automatically exhibits the correct graphic and geometric relationships in an interactive fashion. Thus, the present invention allows an operator to more rapidly produce accurate digital computer drawings that conform to predefined specifications for appearance, content and relationships among the graphic objects that convey cognition for the intent of designs. The computer operator is relieved of the duty of learning the correct layout of graphic objects to assemble a valid representation of a design, system or model. In effect, a system according to the present invention is an "expert" CAD system, so that the operator need not be very knowledgeable to produce correct graphic results and representations.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A method of operating a computer aided design system in presumptive mode, comprising the steps of:

moving a selected graphic object relative to a graphic pointing symbol;

determining when the selected graphic object is within a predetermined proximity of an underlying graphic object;

manipulating the selected graphic object into a geometric relationship with the underlying graphic object according to predetermined geometric rules; and dynamically updating the geometric relationship based on movement of the graphic pointing symbol while the graphic pointing symbol remains within the predetermined proximity of the underlying graphic object.

2. The method of claim 1, wherein the predetermined proximity is a location tolerance before said manipulating step and converts to a larger rejection tolerance during said maintaining step.

3. The method of claim 1, wherein said manipulating step comprises the step of:

orientating the selected graphic object according to a tangential angle with respect to the underlying graphic object at a cling point.

4. The method of claim 1, wherein said manipulating step includes the step of:

positioning the selected graphic object at a predetermined offset relative to the underlying graphic object.

5. The method of claim 4, wherein the underlying graphic object has two sides, during said maintaining step, further comprising the step of:

moving the selected graphic object to the opposite side of the underlying graphic object when the graphic pointing symbol is moved to the opposite side.

6. The method of claim 5, wherein said maintaining step further comprises the step of:

mirroring the selected graphic object about the underlying graphic object when moved to the opposite side of the underlying graphic object.

7. The method of claim 6, wherein said maintaining step further comprises the step of:

mirroring the selected graphic object about a perpendicular offset line when moved to the opposite side of the underlying graphic object.

8. The method of claim 5, wherein said maintaining step further comprises the step of:

mirroring the selected graphic object about a perpendicular offset line when moved to the opposite side of the underlying graphic object.

9. The method of claim 1, after said manipulating step, further comprising the step of:

modifying the underlying graphic object according to the predetermined geometric rules.

10. The method of claim 9, wherein said modifying step comprises the step of:

dividing the underlying graphic object into two separate underlying graphic objects for inserting the selected graphic object therebetween.

11. The method of claim 10, wherein said modifying step further comprises the step of:

deleting a portion of the original underlying graphic object for inserting the selected graphic object.

12. The method of claim 1, wherein the selected graphic object includes at least one alignment vector, said manipulating step further comprising the step of:

aligning the selected graphic object with the underlying graphic object according to the alignment vector.

13. The method of claim 1, wherein the selected graphic object and the underlying graphic object each have an alignment vector, wherein said manipulating step comprises the step of:

aligning the selected graphic object with the underlying graphic object by aligning the alignment vectors.

14. The method of claim 1, wherein the selected graphic object includes a clip region, said manipulating step further comprising the step of:

partially deleting the underlying graphic object according to the clip region.

15. The method of claim 14, wherein the underlying graphic object comprises a plurality of graphic objects, said partially deleting step further comprising the step of:

partially deleting only selected ones of the plurality of graphic objects corresponding to the clip region.

16. The method of claim 1, wherein said maintaining step further comprises the steps of:

clinging the selected graphic object to an initial cling point; and rotating the selected graphic object about the initial cling point corresponding to movement of the graphic pointing symbol.

17. The method of claim 1, further comprising the step of:

unclinging the selected graphic object from the underlying graphic object to move with the graphic pointing symbol when the graphic pointing symbol is moved a greater distance than the predetermined proximity from the underlying graphic object.

18. The method of claim 1, wherein said maintaining step includes the step of:

moving the selected graphic object relative to a sliding cling point along the underlying graphic object where the cling point moves relative to the graphic pointing symbol as the graphic pointing symbol is moved within the predetermined proximity of the underlying graphic object.

19. The method of claim 18, wherein said maintaining step further comprises the step of:

interactively modifying the underlying graphic object according to the predetermined rules and relative to the sliding cling point as the graphic pointing symbol is moved.

20. The method of claim 18, wherein the underlying graphic object includes a primary vector and a secondary vector, the selected graphic object having a first alignment vector and a second alignment vector, wherein said manipulating and maintaining steps further comprise the steps of:

aligning the selected graphic object with the primary vector according to the first alignment vector when the first alignment vector is within a predetermined proximity of the primary vector; and aligning the selected graphic object with the secondary vector according to the second alignment vector when the second alignment vector is within a predetermined proximity of the secondary vector.

21. A method of operating a computer aided design system, comprising the steps of:

providing at least one graphic object to be selected for insertion into a graphic design;

displaying and moving a selected graphic object with a graphic cursor moved within the graphic design;

when the selected graphic object is within a predetermined proximity with respect to one or more underlying graphic objects, automatically manipulating the object into a geometric relationship with the underlying graphic object; and dynamically updating the geometric relationship based on movement of the graphic cursor while the graphic cursor remains within the predetermined proximity of the underlying graphic object.

22. The method of claim 21, wherein said manipulating step comprises the steps of:

orienting the selected graphic object relative to a cling point along the underlying graphic object; and positioning the selected graphic object at a predetermined offset relative to the cling point.

23. The method of claim 22, further comprising the step of:

continually re-orienting and re-positioning the selected graphic object relative to a sliding cling point which moves relative to the graphic cursor as it is moved within the predetermined proximity.

24. A presumptive mode computer aided design system for interactively manipulating and displaying a selected object according to predefined geometric relationships, comprising:

a display device for displaying a graphic environment;

memory for storing data, including:

a data base defining geometric relationships among graphic objects;

a plurality of graphic object files, each defining a corresponding graphic object and associated symbol for display in said graphic environment; and a design file for incorporating a plurality of underlying graphic objects according to said geometric relationships;

a pointing device for receiving input from an operator; and a processor coupled to said memory, said display device and said pointing device for controlling said graphic environment;

wherein the operator selects an object for insertion into said design file and manipulates a graphic cursor in proximity with one of said underlying graphic objects displayed in said geographic environment, wherein said processor moves said selected object with said graphic cursor and then manipulates said graphic object and said design file in to a geometric relationship when said selected object is within proximity with said one of said underlying graphic objects, and wherein said processor dynamically updates said geometric relationship based on movement of said graphic cursor while said graphic cursor is within proximity of said underlying graphic objects.

* * * * *